Dec. 17, 1963  E. CAMPBELL  3,114,747
PROCESS FOR PRODUCING A FIBROUS REGENERATED
CELLULOSE PRECIPITATE
Filed March 26, 1959  2 Sheets-Sheet 1
FIG. I
FIG. II
FIG. III
FIG. IV
INVENTOR
ESPERANZA CAMPBELL
BY Carl A. Hechmer
ATTORNEY Dec. 17, 1963    E. CAMPBELL    3,114,747
PROCESS FOR PRODUCING A FIBROUS REGENERATED
CELLULOSE PRECIPITATE
Filed March 26, 1959      2 Sheets-Sheet 2
FIG. Ia
FIG. IIa
FIG. V
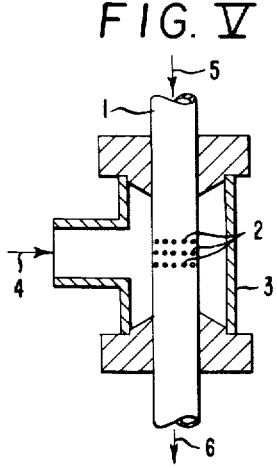
INVENTOR
ESPERANZA CAMPBELL
BY *Carl A. Hechmer*
ATTORNEY United States Patent Office 3,114,747
Patented Dec. 17, 1963

3,114,747
PROCESS FOR PRODUCING A FIBROUS REGENERATED CELLULOSE PRECIPITATE
Esperanza Campbell, Wilmington, Del., now by change of name Esperanza Parrish, assignor to E. I. du Pont de Nemours and Company, Wilmington, Del., a corporation of Delaware
Filed Mar. 26, 1959, Ser. No. 802,140
5 Claims. (Cl. 260—212)

This invention relates to regenerated cellulose products. More specifically it is concerned with a novel and useful water absorbent cellulose precipitate.

It is an object of this invention to provide water absorbent cellulose precipitates which may be used in the manufacture of paper and other non-woven structures.

Another object is to provide water absorbent cellulose precipitates particularly suitable for use as binders and supporting or reinforcing fibers in non-woven or paper structures.

A further object is to provide a process for preparing the water absorbent cellulose precipitates described and claimed herein.

These and other objects will become apparent in the course of the following specification and claims.

The water absorbent cellulose precipitate of the present invention is composed of strong and oriented regenerated cellulose fiber structures 2 to 80 mm. long and 0.01 to 0.05 mm. in diameter with a tenacity above about 0.4 g.p.d., an initial modulus above about 15 g.p.d., a density between 1.480 and 1.522, containing 30 to 50% crystalline material, and having an orientation angle below 60°. These structures are formed by precipitating cellulose from solution by a proper combination of shearing conditions and coagulation rate to provide and $R'_s$ value as defined in Formula 5 below, between 1 and 1030, preferably between 3 and 300. The formula for expressing $R'_s$ is derived as follows:

The three variables which play a major role in controlling the nature of a cellulose precipitate are: (1) the shearing stress $S_p$ supplied to the solution by the precipitant as it enters the shear zone, (2) the rate of stretching $R_s$ of the polymer solution, as it is converted to an elongated article, which depends upon, among other things, the solution viscosity $V_s$, (3) the length of time $t$ that the solution is in a deformable state (i.e., prior to complete coagulation).

The rate of shear $R$ is proportional to the shearing stress $S$. Introducing the viscosity $V$ as a proportionality constant, the equation becomes $$S = VR$$

Using the subscript $s$, for the solution and the subscript $p$, for the precipitant or coagulant, the shearing stress in the precipitant and in the solutions is given by the equations $$S_p = V_p R_p \quad (1)$$
$$S_s = V_s R_s \quad (2)$$

It is reasonable to assume that the shearing stress is transmitted undiminished from the precipitant to the solution so that $$S_p = S_s \quad (3)$$

and Equations 1 and 2 may be equated to give $$R_s = \frac{V_p}{V_s} R_p \quad (4)$$

The type of fiber products formed will depend on $t$, the time interval during which the precipitate is deformable. The product $R_s t$ will be designated $R'_s$ (the total shear), which is determined from the relationship $$R'_s = \frac{V_p}{V_s} R_p t \quad (5)$$

The total shear can be calculated by Equation 5 if $R_p$ and $t$ are known. For stirring device, such as the Waring Blendor, the shear rate in the precipitant $R_p$ can be expressed as follows:

$$R_p = 0.005 \frac{a^{3/2} \cdot Q^{3/2} \cdot d_p^{1/2}}{b^{1/2} \cdot V_p^{1/2}} \quad (6)$$

$$R_p = 0.137 \frac{a^{6/5} \cdot Q^{6/5} \cdot d_p^{1/5}}{b^{4/5} \cdot V_p^{1/5}} \quad (7)$$

in which $a$ = the distance in centimeters from the axis to the tip of the stirrer blade.
$b$ = average width of stirrer blade in centimeters.
$Q$ = stirring speed in r.p.m.
$V_p$ = viscosity of the precipitant in poises.
$d_p$ = density of the precipitant in gm./cc.

Equation 6 is used if the flow is laminar, i.e., the Reynolds number $R_e$ is smaller than 3350; Equation 7 is used if the flow is turbulent, i.e., $R_e$ is greater than 3350. The Reynolds number is determined by the equation $$R_e = \frac{\pi}{60} ab \frac{d_p}{V_p} Q \quad (8)$$

As mentioned earlier, the type of fiber products formed will depend on $t$, the time interval during which the precipitate is deformable. In calculating $t$ for these systems it is assumed that the solution droplet in the shear zone coagulates or precipitates because coagulant, or precipitant, diffuses from the bath into the drop until a certain critical concentration is obtained at a distance of 0.1 micron from the droplet surface. This critical concentration is the "molarity needed for coagulation." It will be designated C and expressed in mols per liter.

The diffusion equation which is appropriate for these calculations is $$C = C_0 \left[ 1 - \psi\left(\frac{x}{2\sqrt{Dt}}\right) \right] \quad (9)$$

where $C$ = molarity needed for coagulation
$C_0$ = bath concentration (molar)
$x$ = distance diffused (0.1 micron)
$D$ = diffusion constant ($10^{-5}$ cm.²/sec.)

$$\psi = \frac{2}{\sqrt{\pi}} \int_0^{\frac{x}{2\sqrt{Dt}}} e^{-y^2} dy \quad (10)$$

There is good theoretical justification for selecting values close to 0.1 micron for $x$ and close to $10^{-5}$ cm.²/sec. for D, although the selection of these exact values is somewhat arbitrary. For convenience, it is assumed that D is the same for all ions, since this assumption introduces little error in the final calculations.

One of the more important systems for use in this invention is viscose in which the cellulose is dissolved in an aqueous caustic solution in the form of sodium cellulose xanthate. The table below lists C values for all salts which are commonly used with viscose.

TABLE OF MOLARITIES

| | |
|---|---|
| Lithium chloride | 3.94 |
| Sodium nitrate | 3.90 |
| Sodium chloride | 2.65 |
| Sodium sulfate | [1] 2.20 |
| Potassium chloride | 1.50 |
| Ammonium sulfate | [1] 1.30 |
| Barium chloride | 0.75 |
| Ethylenediamine sulfate | 0.42 |
| Magnesium sulfate | 0.30 |
| Trimethylbenzylammonium sulfate | 0.18 |
| Sulfuric acid | [1] 0.050 |
| Hydrochloric acid | 0.028 |
| Zinc Sulfate | 0.0060 |
| Cadmium sulfate | 0.0018 |

[1] Molarity of cation.

The value of C will depend on such variables as cellulose concentration, caustic content DP additives, etc. (DP refers to degree of polymerization.) However, all of these variables are taken into account by the salt index S, which is commonly used in the viscose industry. The C values listed in the table of molarities were determined using a viscose having a salt index of 16. C should therefore be multiplied by $S/16$ before applying Equation 9 to a viscose of index other than 16. The proper equation is, then, $$Y = \frac{SC}{16C_0} = 1 - \psi\left(\frac{x}{2\sqrt{Dt}}\right) \quad (11)$$

Values of $t$ are calculated by substituting selected values for $$\frac{SC}{16C_0}$$

When these values are plotted against $$\frac{SC}{16C_0}$$

it is found that $t$ becomes infinite when $$\frac{SC}{16C_0}$$

becomes one. Physically, this means that the fibrous precipitates of this invention cannot be formed from the viscose when $$\frac{SC}{16C_0}$$

i.e., Y is greater than one. Accordingly a graph is constructed showing the relationship between $t$ and Y by selecting values of Y between 0 and 1. If C is not known, it may be determined by the salt index method. Thus, Y can be calculated from the available experimental data on the coagulation bath and $t$ determined from the graph.

If the salt index is determined directly for the fluid which is being used, the method described above will apply equally well to single component and multi-component baths. The table of molarities needed for coagulation can, of course, be used directly for a single component bath. If no values are available for the multicomponent bath used, an excellent approximation of the correct value for Y can be obtained by calculating with the aid of the following equation, using the values for each individual component taken from the table of molarities.

$$Y = \frac{S}{S_{std}} \frac{1}{\frac{C_{0,1}}{C_{1_{crit}}} + \frac{C_{0,2}}{C_{2_{crit}}} + \frac{C_{0,3}}{C_{3_{crit}}}} \quad (11a)$$

in which $C_{0,1}$ = molar concentration of component 1
$C_{0,2}$ = molar concentration of component 2
$C_{0,3}$ = molar concentration of component 3 and $C_{1_{crit}}$ = molarity of component 1 needed for coagulation in a 1-component bath
$C_{2_{crit}}$ = molarity of component 2 needed for coagulation in a 1-component bath
$C_{3_{crit}}$ = molarity of component 3 needed for coagulation in a 1-component bath This type of calculation can be extended to a bath containing more than three components, but such baths are generally not used. Obviously, the equation can be used for a two-component bath system.

The invention will be more readily understood by reference to the figures. FIGURES I and II are photomicrographs of the products produced in Examples 3 and 5 as identified in those examples. FIGURES III and IV are photomicrographs of products produced in Example 7 as identified therein.

FIGURES Ia and IIa are artist's respresentations of part of the photomicrographed structures of FIGURES I and II.

FIGURE V is a "T-tube" precipitator employed and described in Example 13.

In the examples which follow various properties are reported. These properties and the techniques employed in their determinations are reported below.

The *salt index* used to determine the effectiveness of coagulating baths is based upon the fact that a cellulose xanthate is partially precipitated when a drop of viscose is dispersed in an aqueous sodium chloride solution. When a definite and reproducible degree of coagulation is adopted as the end point and the manner of dispersing the viscose is standardized, the concentration of sodium chloride required to reach the end point decreases as the viscose ages. The concentration (expressed in percent) of salt solution which produces this end point is reported as the index.

In making this test, a solution is prepared by adding an amount of 10% sodium chloride solution (25% sodium chloride solution for an index above 9.5) equivalent to the expected index along with sufficient water to make a total volume of 40 ml. For example, if the index is expected to be about 4.0, 16 ml. of the 10% sodium chloride solution and 24 ml. of water are added to a 250 ml. Erlenmeyer flask. The flask is then placed on a platform of a shaker (such as those made by the Clarksville Machine Company in Clarksville, Tennessee), and the coagulating solution is mixed by allowing it to shake for 28–35 seconds.

A test sample of viscose is obtained by inserting a 6 inch long 5 mm. diameter glass rod into the viscose to a depth of 2 inches and withdrawing without touching the sides of the container. The viscose is allowed to drain while holding the rod in a vertical position until the continuous stream breaks. The first two or three drops which fall from the rod are discarded and the third or fourth drop is allowed to fall into the flask containing the salt solution. The flask is returned to the shaker and shaken for 28–35 seconds. It is then removed from the shaker and the contents examined in good illumination while swirling the flask slightly to bring all of the contents into view. The proper end point, which should be complete in about 30 seconds after the shaking is completed, is the appearance of 2–5 small 1/16–1/8 inch diameter flocks or tufts of whitish fibers similar in appearance to precipitated aluminum hydroxide. If no coagulation has occurred a higher concentration of sodium chloride is used in the next test. Conversely, if the coagulation is too extensive, a lower concentration of sodium chloride is used in the next test.

*Initial modulus* is determined by measuring the initial slope of the stress-strain curve.

*Orientation angles* are measured by drawing a line from each end of the arc of the second equatorial spot to the center of an X-ray diffraction pattern of a sample of a fiber. The angle formed by these lines is called the orientation angle and reflects the alignment of the crystallites with respect to the fiber axis or direction of draw in a fiber or film.

*Gel swelling* is a measure of the amount of liquid retained by regenerated cellulose yarns which have not been dried. Gel swelling is reported as a percentage of the weight of the oven-dried yarn and frequently falls in the range of 200–400%.

*Bulk density* is determined by filling with firm hand pressure a 30 ml. beaker with dried fluffed fibers, weighing the fibers, and dividing by the volume. This is a semi-quantitative measurement which is estimated to be precise within ±25%.

*Water absorption* is measured by evenly distributing, without compression, a two-gram sample of the material in a Buchner funnel (2½ inch diameter x 1¾₁₆ inch deep). One hundred ml. of water containing 0.1 gram of sodium lauryl sulfate is poured over the sample and allowed to drain by gravity for about 1 minute. The funnel is then connected to an overflowing reservoir so as to produce a ⅜ inch head of water in the funnel at equilibrium. When water begins to flow into the funnel, a No. 11 rubber stopper weighing 67.4 grams is placed on the sample with the large face down. A two-pound weight is placed on the stopper. After ten minutes the petcock is turned to permit the sample to drain. After an additional ten minutes the sample is removed and weighed.

*The tensile strength* of sheet materials is determined by modification of TAPPI test T205m53 in which the pulp slurry is poured onto a 100-mesh screen to make a sheet which is washed with 10 liters of water, removed from the screen, and dried in an oven with air maintained at approximately 100° C. One-half inch strips are cut from the sheet and the strength measured on an Instron tester. The values are calculated on the basis of a one-inch strip. To determine the wet strength, one-half inch strips are cut from the dried sheet and placed in water, where they are soaked for 30 minutes at room temperature. The wet strength is also measured on an Instron tester and the results calculated on the basis of a one-inch width. Tenacities expressed as grams/denier may be converted to values expressed as lbs./in./oz./yd.² by multiplying by 17.

*Elmendorf tear strength* is measured on the Elmendorf tear tester according to the procedure described in TAPPI test T414m49. The strength recorded is the number of grams of force required to propagate a tear the remaining distance across a 63 mm. strip in which a 20 mm. standard cut has been made.

*Basis weight* is the weight per unit area of a nonwoven structure.

*Tear factor* is calculated by dividing the Elmendorf tear strength in grams by the basis weight in g./m.².

*Burst strength* is measured on the Mullen burst tester according to the procedure described in TAPPI test T40m53.

*Fold endurance* is determined by TAPPI test T423m50, using the M.I.T. folding endurance tester.

The following examples are cited to illustrate the invention. They are not intended to limit it in any way. The R′$_s$ values and variables from which they are calculated are reported in Tables I and II.

EXAMPLE 1

Blending of Long and Short Cellulose Precipitates

A cellulose xanthate is prepared by adding approximately 26% by weight of carbon disulfide (based on cellulose) to alkali cellulose. This is dissolved in caustic solution to form a viscose containing 5% cellulose and 9% caustic (calculated as sodium hydroxide) which is ripened to a salt index of 4.0. This viscose (250 ml.) is added to 1000 ml. of 20% ammonium sulfate in a 5 quart Waring Blendor operating at approximately 8000 r.p.m. A 2% sulfuric acid solution at 70° C. (1500 ml.) is added with the Waring Blendor still operating at approximately 7000 r.p.m. The regenerated cellulose precipitate (1–a) is filtered, washed with additional 2% sulfuric acid solution, washed free of acid and dispersed in 300 ml. of water. Two of the individual or ultimate fibrillar particles have the following properties:

| | | |
|---|---|---|
| Tenacity (g.p.d.) | 1.6 | 1.11 |
| Elongation (percent) | 8.0 | 3.5 |
| Initial Modulus (g.p.d.) | 25.4 | 50.5 |
| Denier | 10.8 | 11.8 |

Another portion of the same viscose (40 grams) is added to 300 ml. of 20% sodium sulfate in a one-quart Waring Blendor operating at approximately 6000 r.p.m. To the slurry of cellulose xanthate precipitates are added 20 ml. of 10% sulfuric acid solution and the mixture allowed to stand for approximately 5 minutes. The cellulose precipitates (1–b) are filtered, washed free of acid, and blended with a portion of the slurry of (1–a) prepared as described above to produce a composite slurry containing approximately 0.1% of fibrous material, 20% of which are the shorter "1–b" cellulose precipitates. The remainder being the longer, i.e. "1–a" cellulose particles which serve as binder and reinforcing fibers for the structure. A sheet is prepared by depositing this slurry on a 100-mesh screen. The sheet is pressed and dried for 20 minutes at 100° C. The dried sheets have the following properties: dry tenacity=0.14 g.p.d., wet tenacity=0.007 g.p.d., dry elongation=2.2%, Elmendorf tear strength=192 grams, basis weight=107 g./m.², and tear factor=1.8.

EXAMPLE 2

Highly Oriented Regenerated Cellulose Precipitates 400 ml. of a viscose as described in Example 1 is added from a separatory funnel into 1500 ml. of a 10% ammonium sulfate solution in a 5-quart Waring Blendor operating at approximately 8000 r.p.m. After all the viscose is added (which takes approximately 20 minutes) 1120 ml. of a 40% ammonium sulfate solution is added while stirring is continued. The slurry of cellulose xanthate precipitates is filtered on a 100-mesh handsheet mold. The precipitates are dispersed in about 2 liters of a 2% sulfuric acid solution heated to 90° C. and the slurry allowed to stand for 10 minutes at room temperature. The regenerated cellulose precipitates are washed with water until acid-free. These long, soft precipitates have the following properties: gel swelling=3.34, bulk=0.043 g./cc., absorbency=7.8 grams water per gram of precipitate. They have an orientation angle of approximately 18° C.

The properties of two of the precipitates selected at random from this sample are listed below. The measurements were made on an Instron tester.

| | | |
|---|---|---|
| Tenacity (g.p.d.) | 2.06 | 2.18 |
| Elongation (percent) | 3.76 | 5.87 |
| Initial modulus (g.p.d.) | 89.6 | 80.7 |
| Denier | 5.4 | 6.6 |

EXAMPLE 3

*Preparation of Glassine Type of Paper From Regenerated Cellulose Precipitate Homosheet*

60 grams of a viscose as described in Example 1 is added to 300 ml. of a 15% sodium sulfate solution in a Waring Blendor operating at approximately 6000 r.p.m. Stirring is stopped after about 2 minutes and 400 ml. of a 10% sulfuric acid solution are added with no stirring. After this mixture has been allowed to stand for 2–3 minutes, the cellulose precipitates are filtered, washed acid-free, and redispersed by stirring in a Waring Blendor with 400 ml. of water for about one minute. They are shown at a magnification of about 100 times in FIGURES I and Ia. The precipitates are deposited on a 100-mesh screen, the sheet is removed, dried in an air oven at 50° C. for about 3 minutes, and pressed between blotters at 100° C. and 300 p.s.i. for 15 seconds. This 5 mil thick sheet has the following properties: dry tenacity=0.03 g.p.d., wet tenacity=0.03 g.p.d., burst strength=13 p.s.i., and basis weight=92 g./m.$^2$ (2.2 oz./yd.$^2$).

EXAMPLE 4

*Regeneration on the Screen*

24 grams of a viscose as described in Example 1 is added to 300 ml. of a 20% sodium sulfate solution in a one-quart Waring Blendor operating at approximately 2,000 r.p.m. The slurry of precipitates obtained is blended with a slurry of staple fiber obtained by cutting high tenacity 1.5 d.p.f. tire cord rayon to ½ inch staple and dispersing 2.1 grams of this staple in 4 liters of 20% sodium sulfate solution. The blend of fibrous material is deposited on a 100-mesh screen. The sheet obtained is covered with a 100-mesh screen and rinsed with 3 successive portions of 3.5 liters each of a 5% sulfuric acid solution. The sheet is drained by gravity and washed until acid-free. It is removed from the screens and dried on a hot plate at 90° C. The dried sheet has the following properties: dry tenacity=0.26 g.p.d., wet tenacity=0.07 g.p.d., dry elongation=2.1%, wet elongation=9.1%, tongue tear strength=0.22 lbs./oz./yd.$^2$, Elmendorf tear strength=218 grams, basis weight=59 g./m.$^2$, tear factor=3.7, and burst strength=11 p.s.i.

EXAMPLE 5

*Use of Beaten Cellulose Precipitates*

100 grams of a viscose as described in Example 1 is added for 10 minutes at the rate of 10 grams per minute simultaneously with 60 ml./min. of 2% sulfuric acid solution into a mixture of 1,000 ml. of 20% sodium sulfate solution and 550 ml. of 2% sulfuric acid solution in a 5-quart Waring Blendor operating at approximately 8,000 r.p.m. This experiment is repeated and the precipitates combined to produce a total of 10 grams. The cellulose precipitates (shown in FIGURE II at a magnification of about 60 times) are deposited on a 100-mesh screen, washed until free of acid, and divided into two portions.

One portion of the precipitates is suspended in 4 liters of water and deposited on a 100-mesh 8" x 8" screen. After drying at 100° C. the sheet has the following properties: dry tenacity=0.06 g.p.d., dry elongation=7.5%, initial modulus=3.4 g.p.d., wet tenacity=0.01 g.p.d., Elmendorf tear strength=131 grams, basis weight=111 g./m.$^2$, and tear factor =1.18.

The second portion is suspended in water and passed through a disc mill with the clearance set at 0.001–0.002". The beaten precipitates in the slurry are deposited on a 100-mesh 8" x 8" screen. After drying the sheet has the following properties: tenacity=0.12 g.p.d., dry elongation=7.6%, initial modulus=6.7 g.p.d., wet tenacity =0.01 g.p.d., Elmendorf tear strength=70 g., basis weight=90 g./m.$^2$, and tear factor=0.78.

EXAMPLE 6

*One-Bath System—Addition of Acid in Two Stages*

100 grams of a viscose solution as described in Example 1 is added at a rate of 10 g./min. for 10 minutes to a coagulating bath containing 1000 ml. of 20% sodium sulfate solution and 300 ml. of 2% sulfuric acid solution in a 5-quart Waring Blendor operating at approximately 7,000 r.p.m. Simultaneously, 300 ml. of 2% sulfuric acid are added at a rate of 30 ml./min. The slurry of long cellulose precipitates is added to 3 liters of a 2% sulfuric acid solution and the mixture allowed to stand for 10 minutes. The precipitates are collected, washed thoroughly with water, and dispersed in 300 ml. of a 0.1% sodium carboxymethylcellulose solution in a 1-quart Waring Blendor operating at approximately 14,000 r.p.m. Beating is continued for one minute, following which the beaten precipitates in the aqueous slurry are deposited on a 100-mesh 8" x 8" screen. After drying at 100° C. the sheet has the following properties: dry tenacity=0.09 g.p.d., wet tenacity=0.005 g.p.d., dry elongation=6.5%, Elmendorf tear strength=200 grams, basis weight=113 g./m.$^2$, and tear factor=1.77.

EXAMPLE 7

*50/50 Fiber/Cellulose Precipitate*

30 grams of a viscose as described in Example 1 is diluted with 15 ml. of a 5.75% sodium hydroxide solution and the diluted solution added to 300 ml. of a 10% ammonium sulfate solution in a 1-quart Waring Blendor operating at approximately 7500 r.p.m. As soon as all of the viscose has been added, the stirring speed is reduced to approximately 4000 r.p.m. and 400 ml. of a 10% sulfuric acid solution added. The slurry is stirred for 5 minutes and the cellulose precipitates (7–a) filtered and washed until acid-free. The damp mat of precipitates is dispersed in a slurry of 1.5 grams of a 1.5 d.p.f. high tenacity rayon staple in 3000 ml. of an aqueous medium obtained by mixing 2800 ml. of water with 200 ml. of 5% sodium carboxymethylcellulose solution and adding a few drops of "Triton" X–100. A sheet is formed by depositing the slurry on a 100-mesh screen. The air-dried sheet is pressed damp at 100° C. and 300 p.s.i. until dry. The 5 mil thick sheet has the following properties: dry tenacity=0.49 g.p.d., wet tenacity=0.09 g.p.d., Mullen burst strength=21.5 lbs./in.$^2$/oz./yd.$^2$, basis weight=69 g./m.$^2$, tear factor=6.9, Elmendorf tear strength=480 grams, and fold endurance=2000 cycles.

This experiment is repeated (7–b) using a 15% sodium sulfate solution in place of the 10% ammonium sulfate solution as the coagulating agent. The 5 mil thick sheet obtained has the following properties: dry tenacity=0.41 g.p.d., wet tenacity=0.05 g.p.d., dry elongation=8.5%, Mullen burst strength=20.5 lbs./in.$^2$/oz./yd.$^2$, fold endurance=11,350 cycles, Elmendorf tear strength=608 grams, basis weight=69 g./m.$^2$, and tear factor=88. The air-dried precipitates contained about 40% crystalline material, as determined by X-ray analysis.

EXAMPLE 8

*Vinyl-Coated 70/30 Rayon Staple/Rayon Cellulose Precipitate Blend Sheet*

36 grams of a viscose as described in Example 1 is added to 300 ml. of 15% sodium sulfate solution in a Waring Blendor operating at approximately 7000 r.p.m. As soon as all of the viscose has been added, the rate of stir is decreased to approximately 1000 r.p.m. and 400 ml. of 10% sulfuric acid solution added while stirring is continued. After all of the acid has been added stirring is stopped and the mixture allowed to stand for 5 minutes. The rayon precipitates are filtered and washed until acid-free.

The cellulose precipitates are then redispersed in 300 ml. of water. This suspension is blended with a rayon staple fiber suspension prepared by adding 4.2 grams of ½ inch 1.5 d.p.f. high tenacity rayon staple to an aqueous medium prepared by mixing 4 liters of water with 250 ml. of 1% sodium carboxymethylcellulose and 2–3 drops of "Triton" X-100 (an alkylphenoxy poly(ethylene oxide) nonionic dispersing agent sold by Rohm and Haas Company, Philadelphia, Pa.). The final slurry contains approximately 0.12% of fibrous material, 70% of which is staple fiber. The fibers are deposited on a 100-mesh 12" x 12" screen and the sheet is removed from the screen and dried in an air oven at a temperature of 90° C. The dried sheet is treated on a fabric calender with a finish of the type described in Canadian 518,780. It is then pressed between two pulp sheets at 300 p.s.i. and 150° C. for three minutes, following which it is dried at 90° C. for one hour.

The dried and pressed sheet is coated with a vinyl chloride plastisol. The treated sheet weighs 13 grams and, after coalescence of the polymer, has a tenacity in the machine direction of 14 lbs./in./oz./yd.$^2$ and in the cross direction of 20 lbs./in./oz./yd.$^2$. These tensile properties are comparable to those obtained using a 4 oz./yd.$^2$ cotton backing. This sheet withstands more than 500 scrub cycles.

EXAMPLE 9

Use of Thickened Acid as a Coagulant

A cellulose xanthate is prepared by adding to alkali cellulose approximately 40% of carbon disulfide (based on the weight of cellulose). The viscose prepared from this xanthate contains 6.25% by weight of cellulose and 5.75% caustic (calculated as sodium hydroxide) and is ripened to a salt index of 16.0. This viscose (48 grams) is added to 300 ml. of a mixture obtained by mixing equal volumes of glycerol and 2% sulfuric acid heated to 70° C. in a Waring Blendor operating at approximately 14,000 r.p.m. After stirring for 1–2 minutes an additional 300 ml. of 2% sulfuric acid solution heated to 70° C. is added and the mixture stirred slowly for approximately 5 minutes. The cellulose precipitate slurry is then added to 4 liters of 2% sulfuric acid solution at 70° C. and the pulp deposited on a 100-mesh screen and the liquid removed by gravity flow.

The wet pulp is washed with approximately 20 liters of water. The washed particles are redispersed in the sheet mold and the sheet reformed, removed from the screen, dried in air, and then pressed at 115° C. and 100 p.s.i. for 15 seconds. This 6 mil thick sheet has the following properties: dry tenacity=0.29 g.p.d., dry elongation=12%, initial modulus=13 g.p.d., Elmendorf tear strength=64 grams, basis weight=89 g./m.$^2$, tear factor=0.72, and burst strength=24 p.s.i.

EXAMPLE 10

Regenerating on the Screen 60 grams of a viscose solution as described in Example 9 is added to 400 ml. of 25% sodium sulfate solution at room temperature in a Waring Blendor operating at approximately 8000 r.p.m. The cellulose xanthate precipitates in the slurry are deposited on a 100-mesh screen. While still on the screen, the sheet is dipped into a 2% sulfuric acid solution heated to 80° C. The regenerated cellulose precipitates are then washed free of acid, the sheets removed from the screen and dipped in acetone and then in petroleum ether to extract water quickly. After drying in air the sheet has the following properties: dry tenacity=0.02 g.p.d., wet tenacity=0.01 g., dry elongation=5.3%, wet elongation=9.1%, Elmendorf tear strength=29 g., basis weight=137 g./m.$^2$ and tear factor=0.21.

EXAMPLE 11

High Index Viscose

A cellulose xanthate is prepared by adding to alkali cellulose, 60% by weight of carbon disulfide (based on the weight of cellulose). The xanthate crumb is dissolved in caustic to form a viscose containing 4.93% cellulose and 5.55% caustic (calculated as sodium hydroxide), which is ripened until it has a salt index of 24.9. This viscose is added to 300 ml. of a 25% ammonium sulfate solution in a 1-quart Waring Blendor operating at approximately 14,000 r.p.m. These cellulose precipitates (11–a) form good sheets after being regenerated in an acid bath. Using a combination coagulating and regenerating bath containing 5.3% sulfuric acid, 9.7% sodium sulfate, and 5.3% zinc sulfate gives coarser products (11–b). A 25% sodium sulfate coagulating bath failed to produce cellulose precipitates as defined herein (11–c).

EXAMPLE 12

Cellophane Viscose 50 grams of a viscose containing 9.0% cellulose and 5.5% caustic (calculated as sodium hydroxide) is added to 300 ml. of a 15% sodium sulfate solution in a Waring Blendor operating at approximately 7,500 r.p.m. Addition of a 2% sulfuric acid solution produces regenerated cellulose precipitates (12–a), shown at a magnification of 60 times in FIGURE III, which form satisfactory sheets when deposited on a 100-mesh screen.

Substitution of a 10% ammonium sulfate solution for the 15% sodium sulfate solution also provides satisfactory sheet-forming precipitates (12–b), shown at a magnification of 60 times the FIGURE IV, but these products are coarser than those obtained with sodium sulfate.

EXAMPLE 13

Use of T-Tube Precipitator

A tube as shown in FIGURE V is used for forming the fibrous cellulosic precipitates. It consists of a tube 1 (inside diameter 2 mm.) in which holes 2 are drilled. There are three rows of holes, each containing 12 holes (10 mils diameter in rows 2 mm. apart). The area of tube about the holes is jacketed with a manifold 3, having an inlet 4. The distance from the entrance end 5 of the tube to the first row of holes is 4.2 centimeters, total length of the tube being 10 centimeters.

The precipitant is an aqueous bath containing 9% by weight of sulfuric acid, 18% by weight of sodium sulfate, and 9% by weight of zinc sulfate. This is introduced into the entrance end 5 of the tube under a pressure of 45 p.s.i. and at a flow rate of 40 cc./sec. As soon as the precipitant begins to leave the bottom end 6 of the tube, the viscose solution, which contains 5% by weight of cellulose and has a viscosity of 105 Du Pont seconds and a salt index of 8.0, is introduced under a pressure of 80 p.s.i. and at a flow rate of 4 cc./sec. $R'_s$ for this process is 263. The solvent-precipitant mixture obtained at 6 contains about 0.5% by weight of fibrous precipitate. After drying, these fibers have a water absorbency of 8.8.

EXAMPLE 14

Absorbent Fibrous Regenerated Cellulose Precipitates 300 ml. of viscose having an index of 4.0 prepared as described in Example I is poured rapidly (200 ml. in 70 seconds) into 1.5 liters of an aqueous precipitant containing 18.5% by weight of sodium sulfate and 0.5% by weight of sulfuric acid. The mixing is carried out at room temperature in a 5 quart Waring Blendor, operating at approximately 5500 r.p.m. As soon as the delivery of the viscose is completed, stirring is stopped and the contents allowed to stand for 3 minutes. They are then dumped into a handsheet mold containing about 4 liters of 5% sulfuric acid at room temperature. This slurry is allowed to stand for 15 minutes and the liquid is then drained by gravity. The filter cake is washed acid-free, as determined by the color of an indicating paper. The fibrous product in the filter cake is bleached with a 0.5% sodium chlorite solution at 45° C. The product is then washed free of bleach and the water removed by washing successively with acetone and petroleum ether and air-drying overnight. The product has a water absorbency of 9.1 grams of water per gram.

The process of this invention should be controlled so that the $R'_s$ values are between 1 and 1050. It is preferred that these values be between 3 and 300. Tables I and II show the calculation of $R'_s$ for most of the previous systems.

TABLE I

| Example | Viscose | |
|---|---|---|
| | $V_s$ (du Pont sec.) | Salt Index (S) |
| 1-a | 457 | 3.6 |
| 1-b | 457 | 3.6 |
| 2 | (500) | (3.6) |
| 3 | 528 | 3.0 |
| 4 | 112 | 16.4 |
| 5 | 440 | 2.8 |
| 6 | 440 | 2.8 |
| 7-a | (500) | (3.6) |
| 7-b | (500) | (3.6) |
| 8 | 528 | 3.0 |
| 10 | 121 | 16.4 |
| 11-a | 142 | 24.9 |
| 11-b | 142 | 24.9 |
| 11-c | 142 | 24.9 |
| 12-a | 190 | 5.5 |
| 12-b | 190 | 5.5 |

TABLE II

| Example | Precipitation Bath | | | | Y | Q (r.p.m.) | t | $R'_s$ |
|---|---|---|---|---|---|---|---|---|
| | Composition | Concentration | | | | | | |
| | | Percent | C | $C_0$ | | | | |
| 1-a | ammonium sulfate | 20 | 1.3 | 3.38 | 0.086 | 8,000 | 1.7 | 6.9 |
| 1-b | sodium sulfate | 10 | 2.20 | 3.36 | 0.148 | 6,000 | 2.4 | 6.4 |
| 2 | ammonium sulfate | 10 | 1.3 | 1.60 | (0.18) | 8,000 | 2.8 | 7.3 |
| 3 | sodium sulfate | 15 | 2.20 | 2.4 | 0.17 | 6,000 | 2.7 | 3.9 |
| 4 | sodium sulfate | 25 | 2.20 | 4.36 | 0.565 | 14,000 | 15 | 278 |
| 5 | {sodium sulfate / sulfuric acid} | {13.7 / 0.6} | 0.154 | 2.26 | 0.068 | 8,000 | 1.5 | 4.5 |
| 6 | {sodium sulfate / sulfuric acid} | {16 / 0.4} | .220 | 2.56 | 0.086 | 7,000 | 1.7 | 4.1 |
| 7-a | ammonium sulfate | 10 | 1.3 | 1.60 | 0.18 | 7,500 | (2.8) | (5.5) |
| 7-b | sodium sulfate | 15 | 2.20 | 2.40 | 0.21 | 7,500 | (3.3) | (6.5) |
| 8 | sodium sulfate | 15 | 2.20 | 2.40 | 0.17 | | 2.7 | 4.6 |
| 10 | sodium sulfate | 25 | 2.20 | 4.36 | 0.565 | 8,000 | 15 | 131 |
| 11-a | {ammonium sulfate / sodium sulfate} | {25 / 9.7} | 1.3 | 4.34 | | 14,000 | 9.4 | 138 |
| 11-b | {zinc sulfate / sulfuric acid} | {5.3 / 5.3} | 0.0578 | 3.32 | 0.017 | 14,000 | 0.88 | 12.8 |
| 11-c | sodium sulfate | 25 | 2.20 | 4.36 | 0.786 | 14,000 | 71 | 1,035 |
| 12-a | sodium sulfate | 15 | 2.20 | 2.40 | 0.315 | 7,500 | 4.8 | 24.6 |
| 12-b | ammonium sulfate | 10 | 1.30 | 1.60 | 0.279 | 7,500 | 4.1 | 21.7 |

Values reported in parentheses are based on estimations.
For the 1 qt. Waring Blendor:

$a = 3.0$ centimeters
$b = 0.7$ centimeter

For the large scale equipment used in Examples 1-a, 1-b, 2, 5 and 6:

$a = 4.5$ centimeters
$b = 1.0$ centimeter

Viscosity of viscoses is usually expressed in du Pont seconds. These can be converted to viscosity in poises by multiplying by the factor 0.31.

Some generalizations can be drawn from the equation for calculating $R'_s$ without reference to any specific experimental results. For example, if the particles obtained upon coagulating viscose under a certain set of precipitating conditions are too fine, it is necessary to decrease the mechanical factor R (by decreasing the stirring speed or by increasing the viscosity), and/or to decrease $t$. This quantity may be decreased by decreasing the salt index S (which can be accomplished by increasing the cellulose DP, the cellulose concentration, etc.) or by increasing the bath concentration $C_0$, or by decreasing C (which can be accomplished by heating the bath or by selecting a stronger coagulant, etc.). Conversely, if the particles are too coarse, R should be increased, $V_s$ decreased, and/or $t$ increased.

From the examples it is evident that a variety of fibrous regenerated cellulose products are obtained by precipitating cellulose from solution under conditions which combine adequate shear with the proper rate of coagulation. The principal factors affecting the nature of the product obtained are the solution viscosity, the extent of shear applied during coagulation, and the nature of the precipitating bath. Of these, the precipitating bath is the most important.

The over-all effectiveness of the coagulating system is the primary factor regulating the process and the nature of the products. The rate of coagulation has the greatest effect on the nature of the product obtained. Another very important variable is the extent of shear applied to the precipitate while it is deformable. Accordingly, the shearing is varied in conjunction with the coagulation rate to produce a fibrous product with the desired properties. If a more rapid coagulant is used and it is desired to produce a similar product it will be necessary to increase the rate of shear correspondingly. Bath variables, such as viscosity and temperature, have less effect on the properties of the products than the nature of the coagulant.

The over-all effectiveness of the bath as a coagulating agent can be determined by the salt index method familiar to the rayon industry. For convenience, this method has been described above. The Table of Molarities needed for coagulation given previously lists salts in order of increasing effectiveness as coagulating agents for cellulose xanthate in viscose, which is the preferred solution of this invention. Sodium sulfate, ammonium sulfate, or zinc sulfate or combinations of these salts, are used most frequently.

The major requirement on the shearing conditions during coagulation is that the shear be adequate to extend the precipitate into the form of a fibrous structure. Within the operable range the shear may be varied appreciably while still producing products of rather comparable properties. As indicated earlier, the products obtained at the higher shear levels are more suitable for papermaking operations and those obtained at lower shear levels are more suitable for uses in absorbent products.

Shearing action during coagulation of the viscose is dependent to some extent upon the design of the stirrer and the vessel in which precipitation occurs. Suitable shearing action for preparing the cellulose precipitates of this invention may be obtained by the use of a stirrer having the stirrer paddle or blade at an angle to the plane of rotation of the paddle or blade. Design of the stirrer blade used in a Waring Blendor has been found to be particularly satisfactory. Turbulence can be increased by introducing suitable baffles in a mixing vessel. This design is used in the commercial devices of the Waring Blendor type. The results indicate that cellulose precipitates with a particularly desirable morphology are obtained when precipitation occurs in a shear zone which is also turbulent. The combination of stirrer action and container design generally used in the practice of this invention produces precipitating conditions which combine turbulence with adequate shear.

Other types of apparatus may also be used provided they may be adapted to provide sufficient shear and turbulence. For example, certain viscoses may be jetted into suitable coagulants to produce satisfactory cellulose precipitates. Other modifications may be devised by those skilled in the mixing art.

Viscoses useful in this process contain 0.5% to 20% cellulose, at least 0.2% sodium hydroxide, and have a salt index above 2.0. The most important single viscose variable in determining the limits of operability is the viscosity of the solution, which should be within the range from 1 to 150 poises. The viscosity is determined primarily by the degree of polymerization of the cellulose, the xanthate concentration, and to a lesser extent, by the caustic concentration.

Either the viscose, or the precipitant, or both, may contain additives for modifying the nature of the products obtained. This comprehends the use of additives in the viscose, in the bath, or both, which change or regulate the rate of coagulation by controlling diffusion. The viscose and/or the precipitant may also contain synthetic and/or natural staple fibers, such as those from nylon, poly(ethylene terephthalate), or polyacrylonitrile, staple fibers from cellulose, glass fibers, asbestos, etc. In addition, they may contain the fibrids described in copending applications No. 635,731, filed January 23, 1957, and issued November 6, 1962, as Patent No. 3,062,702. They may also contain dyes, antistatic agents, surfactants, fillers, such as silica or titanium dioxide, pigments, antioxidants, etc. In general, it is more desirable to add fibrous materials to the precipitating or coagulating bath because of the greater difficulty associated with dispersing them in the viscous viscose solution.

The viscose may also contain dispersed polymer particles, such as polytetrafluoroethylene or polyacrylonitrile added to the viscose in solid or dispersed form. After these modified viscoses have been converted to cellulose precipitates by precipitation as described here, the cellulose may be removed by heating or by chemical action to form fine precipitates of the synthetic polymer which has been added to the viscose.

The final products of this invention are regenerated cellulose fibrous structures having an orientation angle below about 60° and comprising ultimate cellulose precipitates 2–80 mm. long and 0.01–0.05 mm. in diameter. These fibrous structures have tenacities above about 0.4 g.p.d. and an initial modulus above about 15 g.p.d. The tenacities fall in the range 0.4 to 2.5 g.p.d. and the initial moduli fall in the range 15 to 100. Intermediate products of this invention, such as the shaped cellulose xanthate precipitates, may be used to produce shaped products, such as paper. The regenerated cellulose precipitates may then be formed in situ.

The stronger products are more desirable for use in the preparation of paper products and for use as binders and reinforcing fibers in combination with other fibrous materials, such as rayon staple or the beaten celluloses generally used for paper making. The preferred method for preparing these products is to use a bath containing both salts and acids so that coagulation and regeneration occur simultaneously, using stirring conditions which provide medium to high shear. Usually the cellulose precipitates formed by this process are permitted to stand in the bath after the initial coagulation is completed. When this is done, it is the usual practice to add more acid and stir the suspension slowly until regeneration is completed. The strongest fibrous products are obtained by using a two-bath system and a very slow coagulating bath. Regardless of the system used for coagulation, it is preferable to use little or no stirring in the bath while regeneration is being completed.

If the rate of shear is gradually reduced while maintaining all other variables constant, the fibrous precipitates tend to become coarser. It is found that these coarser products are less useful as paper-making products but are suitable for uses where water absorbency is an important factor. Products with the best water absorbency have been obtained by using separate coagulation and regeneration baths. The first bath is one in which coagulation occurs rather slowly and relatively little shear is applied during coagulation. The preferred water-absorbent products are found to have water absorbencies above about 6.5 grams of water per gram of fiber when measured by the test described. Under comparable conditions conventional rayon staples have water absorbencies below about 6.0 grams of water per gram of fiber.

If it is desirable or required for a particular application, the cellulose precipitates may be washed and desulfured. Suitable finishes may also be applied where needed. It is also possible to isolate and dry these cellulose precipitates. Drying conditions are not particularly critical as long as they do not involve abrasive action or mechanical attrition. These dried precipitates can be redispersed in aqueous media, from which can be made sheet products with the same desirable properties possessed by those prepared directly from the original slurry. Redispersing is aided by use of an apparatus such as the Hollander beater.

One important characteristic of these precipitates is their bonding strength in sheet products. This is quite evident in both wet and dry sheets. Homosheets have a minimum wet strength of approximately 0.001 g.p.d. and a minimum dry strength before pressing of approximately 0.005 g.p.d. The use of pressure generally tends to produce stiffer, less porous sheets.

The hand and other properties of sheet products prepared from these cellulose precipitates can be controlled and modified in many ways. One of the preferred methods for accomplishing this is to blend them with staple fibers, which may be derived from cellulosic materials, staple of synthetic polymers or chopped synthetic fibers, or staple fibers of natural origin. The addition of staple generally results in a sheet with higher tear strength. Within this area the properties can be controlled or modified by the choice of staple fiber, composition and/or length and/or denier. The properties of heterosheets, i.e., sheets from mixtures of cellulose precipitates and staple, particularly surface properties, may be controlled by the amount and type of pressure applied, calendering temperature, and the like. For example, waterleaves may be prepared from a properly selected combination of cellulose precipitates and staple which may be dried and pressed at suitable pressures and temperatures to fuse the staple and produce a precipitate-reinforced plastic sheet. Other sheet properties, such as absorbency, appearance, reflectance, color, surface smoothness, etc., can be modified by the use of fillers, sizes, dyes, wetting agents, etc.

The properties of the sheet products can also be modified by subjecting the fibrous regenerated cellulose precipitates to the beating operation customarily used for other cellulosic pulps. This usually results in the formation of a smoother, more uniform sheet, and frequently also results in the formation of stronger sheets. The beating operation is particularly advantageous when the fibrous products of this invention are being blended with kraft pulp.

Sheet products prepared from these precipitates have properties which suggest many possible uses. Tests have shown that these papers can be readily marked in the usual manner, so they can be used in conventional paper applications. Sheet products comprising these cellulose precipitates are also ideally suited for substrates for coating operations.

There are many applications other than those in sheet products, however. For example, they may be used as surface modifiers, i.e., modifiers of surface or hand in layered structures. They may also be used in greases and as reinforcing agents for plastics, paint films, oils, caulking compounds, plaster, plasterboard, etc.

The water absorbent cellulose precipitates of this invention have a number of important applications where their unusually high absorbency may be utilized, such as in sponges and sanitary napkins. Additional uses are surgical dressings, disposable diapers, cosmetic pads, air filters, cigarette filters, etc. The good bulking qualities under compressive forces also makes them useful for such applications as thermal insulators and sound barriers.

Many equivalent modifications of the above will become apparent to those skilled in the art from a reading of the above without a departure from the inventive concept.

What is claimed is:

1. A process for producing a fibrous regenerated cellulose precipitate, which comprises preparing an aqueous alkaline solution of cellulose xanthate analyzing 0.5% to 20% cellulose and at least 0.2% sodium hydroxide, having a salt index above 2.0 and having a viscosity of 1 to 150 poises, mixing the solution under conditions of shear with a coagulating bath and regenerating the cellulose, the mixing being conducted at a rate of shear and coagulation to provide a value of $R'_s$ between about 1 and 1030.

2. A process as defined in claim 1 wherein the value of $R'_s$ is between about 3 and 300.

3. A process as defined in claim 1 wherein the coagulating bath is an aqueous solution containing sulfate salt.

4. A process as defined in claim 1 wherein the coagulating bath is an aqueous solution of sulfate salt and sulfuric acid so that coagulation and regeneration occur simultaneously.

5. A process as defined in claim 1 wherein the coagulating bath is an aqueous solution of sulfate salt and the cellulose is regenerated in a separate aqueous bath containing sulfuric acid.

References Cited in the file of this patent

UNITED STATES PATENTS

| | | |
|---|---|---|
| 2,208,637 | Jones et al. | July 23, 1940 |
| 2,332,049 | Bock et al. | Oct. 19, 1943 |
| 2,375,847 | Houtz | May 15, 1945 |
| 3,005,456 | Graham | Oct. 24, 1961 |

FOREIGN PATENTS

| | | |
|---|---|---|
| 368,078 | Great Britain | Mar. 3, 1932 |

OTHER REFERENCES

Webster's New International Dictionary, 2nd edition, unabridged, G. & C. Merriam Company, Springfield, Mass., 1956 (page 576 relied on).

Houwink: Elastomers and Plastomers, volume III, Elsevier Publishing Company, New York, 1948 (pages 164–167 relied on).

Ott et al.: Cellulose and Cellulose Derivatives, 2nd edition, Part I (volume 5 of the High Polymers Series), Interscience Publishers, New York, 1954 (pages 264, 265, 273, 302–310 relied on; 12 pages).